(12) United States Patent
Arche

(10) Patent No.: US 8,923,528 B2
(45) Date of Patent: Dec. 30, 2014

(54) HEARING AID-COMPATIBLE APPARATUS FOR WIRELESS COMMUNICATION DEVICES

(75) Inventor: Glenn S. Arche, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 12/871,635

(22) Filed: Aug. 30, 2010

(65) Prior Publication Data

US 2012/0051570 A1 Mar. 1, 2012

(51) Int. Cl.
*H04R 1/02* (2006.01)
*H04B 5/00* (2006.01)
*H04R 25/00* (2006.01)

(52) U.S. Cl.
CPC .......... *H04R 25/554* (2013.01); *H04R 2225/51* (2013.01); *H04B 5/0081* (2013.01)
USPC ............................................ 381/87; 381/361

(58) Field of Classification Search
USPC ................................... 381/330, 312, 87, 361
See application file for complete search history.

(56) References Cited

U.S. PATENT DOCUMENTS

| | | | |
|---|---|---|---|
| 5,276,538 A | 1/1994 | Monji et al. | |
| 5,796,821 A | 8/1998 | Crouch et al. | |
| 6,175,946 B1 | 1/2001 | Ly et al. | |
| 6,215,373 B1 | 4/2001 | Novak et al. | |
| 6,317,588 B1 | 11/2001 | Curtis et al. | |
| 6,323,533 B1 | 11/2001 | Van Der Zaag et al. | |
| 6,438,245 B1 * | 8/2002 | Taenzer et al. | 381/330 |
| 6,854,848 B2 | 2/2005 | Fujimori et al. | |
| 7,190,390 B2 | 3/2007 | Hett et al. | |
| 7,245,950 B2 | 7/2007 | Iwai et al. | |
| 7,309,149 B2 | 12/2007 | Lee et al. | |
| 7,376,408 B2 | 5/2008 | Hayes et al. | |
| 7,426,951 B2 | 9/2008 | Lee et al. | |
| 7,526,326 B2 | 4/2009 | Vance et al. | |
| 7,535,429 B2 | 5/2009 | Kanno et al. | |
| 7,551,942 B2 | 6/2009 | Hawker et al. | |
| 7,585,077 B2 | 9/2009 | Zakoji et al. | |
| 7,595,784 B2 | 9/2009 | Yamamoto et al. | |
| 7,696,930 B2 | 4/2010 | Akkermans et al. | |
| 7,764,806 B2 | 7/2010 | Pei et al. | |
| 2001/0041602 A1 | 11/2001 | Berger et al. | |
| 2002/0169010 A1 | 11/2002 | Shoji et al. | |
| 2002/0196955 A1 * | 12/2002 | Boesen et al. | 381/312 |
| 2003/0040345 A1 | 2/2003 | Berger et al. | |

(Continued)

OTHER PUBLICATIONS

Accessibility Forum, "Quick Reference Guide to Section 508 Resource Documents," Version 1.0, Sep. 15, 2003, 150 pages.

(Continued)

*Primary Examiner* — Davetta W Goins
*Assistant Examiner* — Amir Etesam
(74) *Attorney, Agent, or Firm* — Judy Yee; Micky Minhas

(57) ABSTRACT

Apparatus and methods are disclosed for wireless communications using a hearing aid, or other suitable receiver. According to one embodiment, a mobile phone device comprises an LCD display having a substantially planar top viewing surface, a transmitter for outputting an electromagnetic signal to an inductively-coupled hearing aid telecoil receiver, and a layer of austenitic stainless steel forming a support frame for the LCD display. A portion of the transmitter and the layer of austenitic stainless steel are positioned underneath the LCD display, thus providing a compact mobile phone design with negligible impact, or even improvement, of the output electromagnetic signal.

20 Claims, 13 Drawing Sheets

(56) References Cited

U.S. PATENT DOCUMENTS

| | | | |
|---|---|---|---|
| 2005/0239519 A1 | 10/2005 | Saitou et al. | |
| 2006/0009156 A1 | 1/2006 | Hayes et al. | |
| 2006/0025172 A1 | 2/2006 | Hawker et al. | |
| 2006/0258414 A1 | 11/2006 | Vance et al. | |
| 2007/0003088 A1 | 1/2007 | Lehtola | |
| 2007/0021156 A1* | 1/2007 | Hoong et al. | 455/575.1 |
| 2008/0130867 A1 | 6/2008 | Bowen | |
| 2009/0074226 A1 | 3/2009 | Eaton et al. | |
| 2009/0143097 A1 | 6/2009 | Wilson | |
| 2009/0186653 A1 | 7/2009 | Drader et al. | |
| 2009/0264156 A1 | 10/2009 | Burghardt et al. | |
| 2010/0134720 A1 | 6/2010 | Choi et al. | |
| 2011/0059348 A1* | 3/2011 | Rothkopf et al. | 429/122 |

OTHER PUBLICATIONS

Berger, TEM Consulting, "Overview of ANSI C63.19—Wireless Hearing Aid Compatibility," 2003, 31 pages.

Jimenez Broas et al., "A High-Impedance Ground Plane Applied to a Cellphone Handset Geometry," *IEEE Transaction on Microwave Theory and Techniques*, vol. 49, No. 7, Jul. 2001, pp. 1262-1265.

Hoolihan, "ANSI C63.19: Establishing Compatibility Between Hearing Aids and Cellular Telephones," [undated], downloaded from http://www.ce-mag.com/archive/01/Spring/Hoolihan.html on Aug. 11, 2010, 8 pages.

IEEE, "American National Standard Methods of Measurement of Compatibility between Wireless Communications Devices and Hearing Aids," ANSI C63.19-2007, Jun. 8, 2007, 145 pages.

Kozma-Spytek et al., "An evaluation of digital cellular handsets by hearing aid users," J. of Rehabilitation Research & Development, vol. 42, No. 4, Jul./Aug. 2005, pp. 145-156.

Mulvany et al., "An Analysis of Inductive Coupling and Interference Issues in Digital Wireless Phones—Technically Feasible Solutions," *Hearing Loss Association of America*, http://www.hearingloss.org/advocacy/TC05.asp, Jan. 15, 2003, 7 pages.

National Physical Laboratory, *Tables of Physical & Chemical Constants (16th edition 1995)*, "Section 2.6.6 Magnetic properties of materials," Kaye & Laby Online, http://www.kayelaby.npl.co.uk/general_physics/2_6/2_6_6.html, 2005, 11 pages.

Nokia Mobile Phones Accessibility Group, "Accessibility Hearing Aid Compatibility with Wireless Devices," 2004, 12 pages.

Seabury et al., "Hearing Aid Compatibility (HAC) and Wireless Devices," *New Technology*, Apr. 2007, 4 pages.

Seabury, "Hearing Aid Compatibility for Wireless Devices," *Conformity*, Jan. 2007, 4 pages.

* cited by examiner

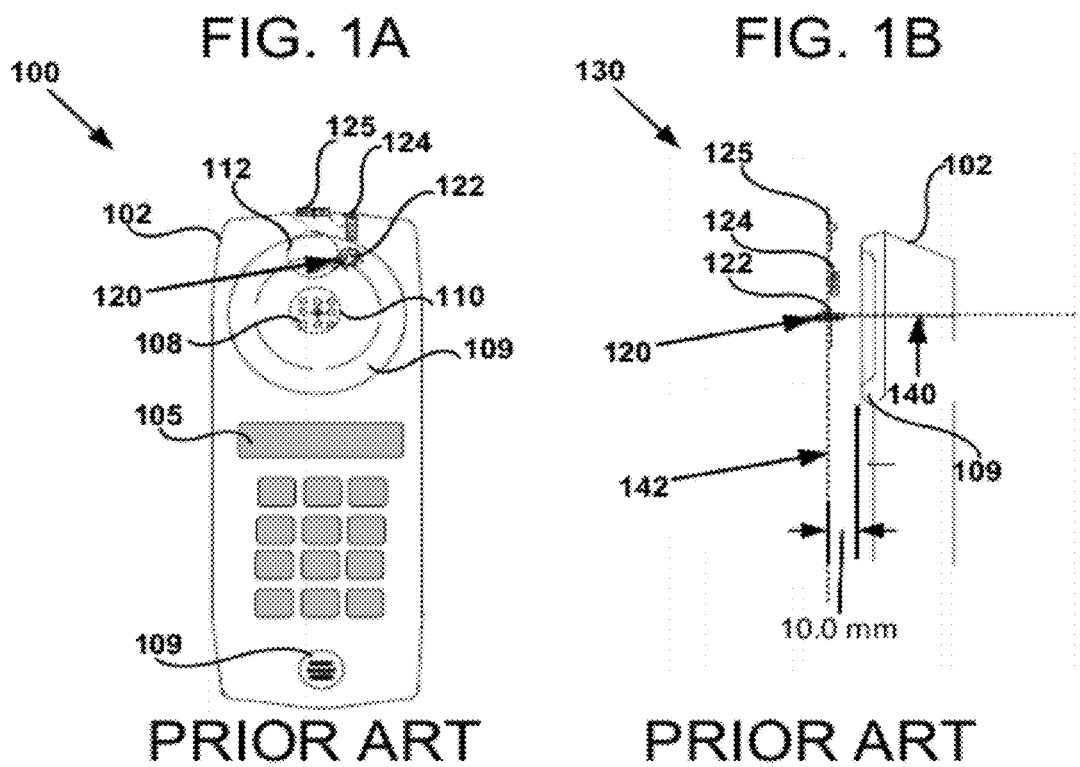

Magnetic field frequency response for WDs with a field <= −15 dB (A/m) at 1 kHz

Magnetic field frequency response for WDs with a field that exceeds −15 dB(A/m) at 1 kHz

PRIOR ART

PRIOR ART

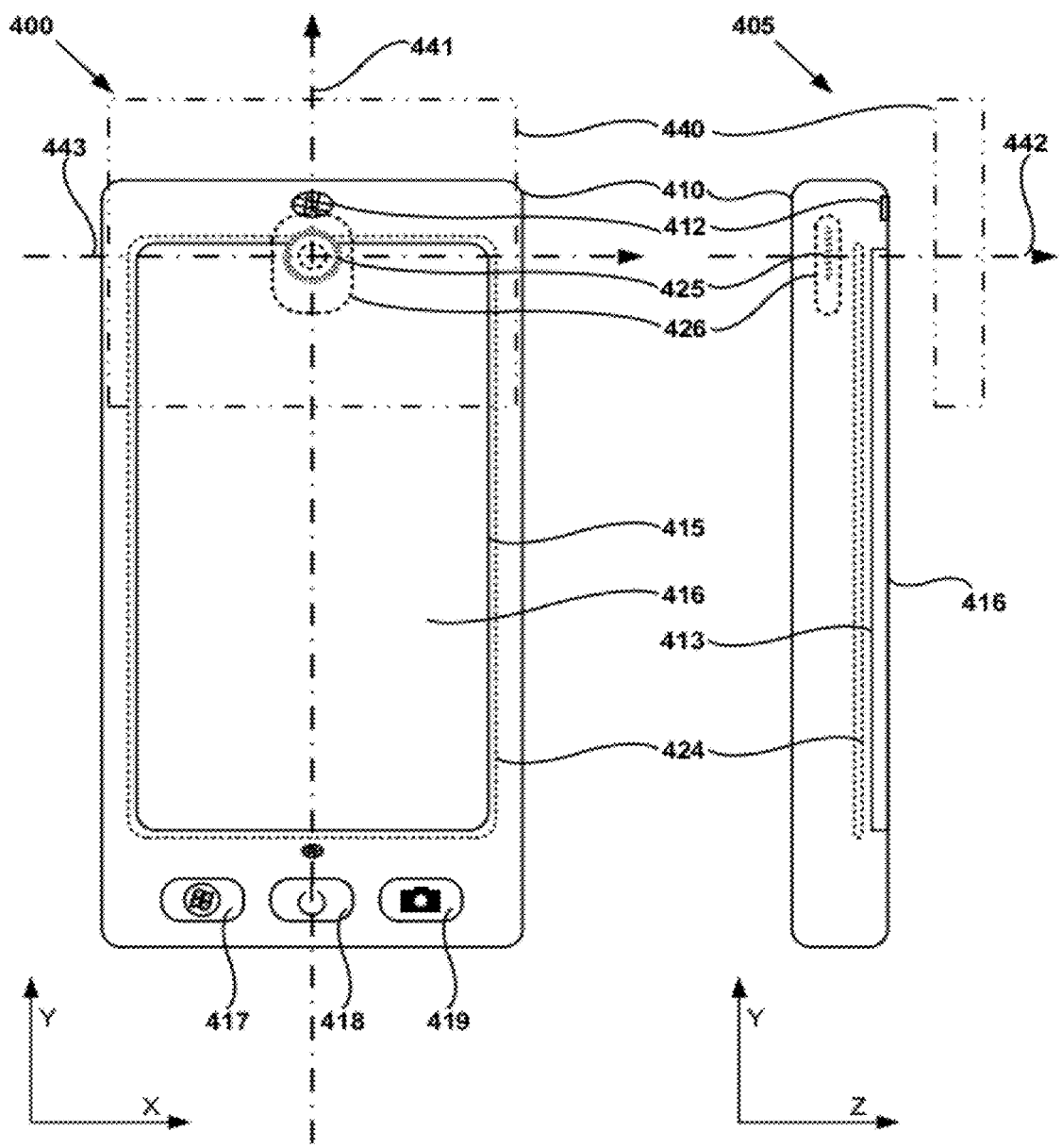

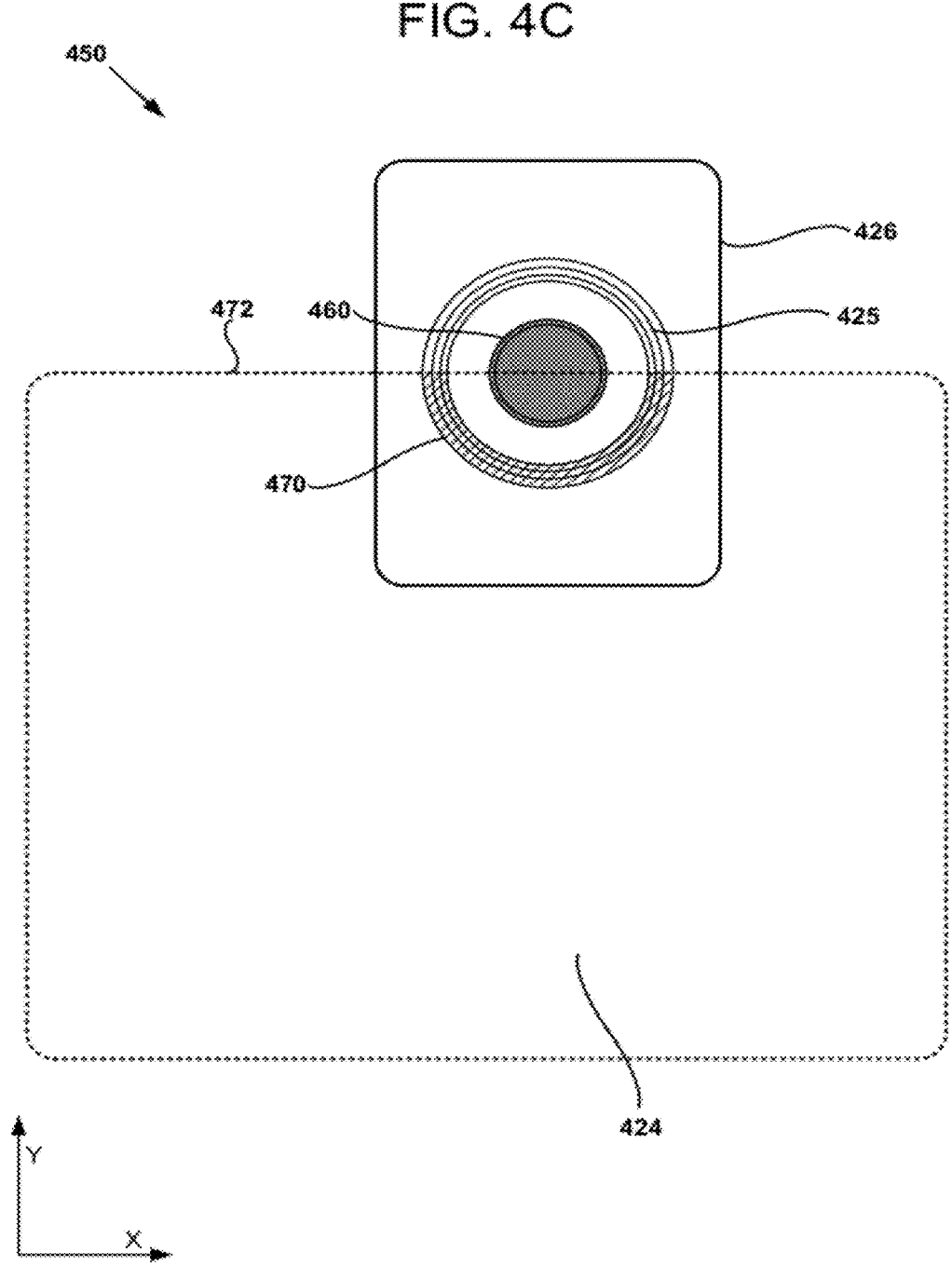

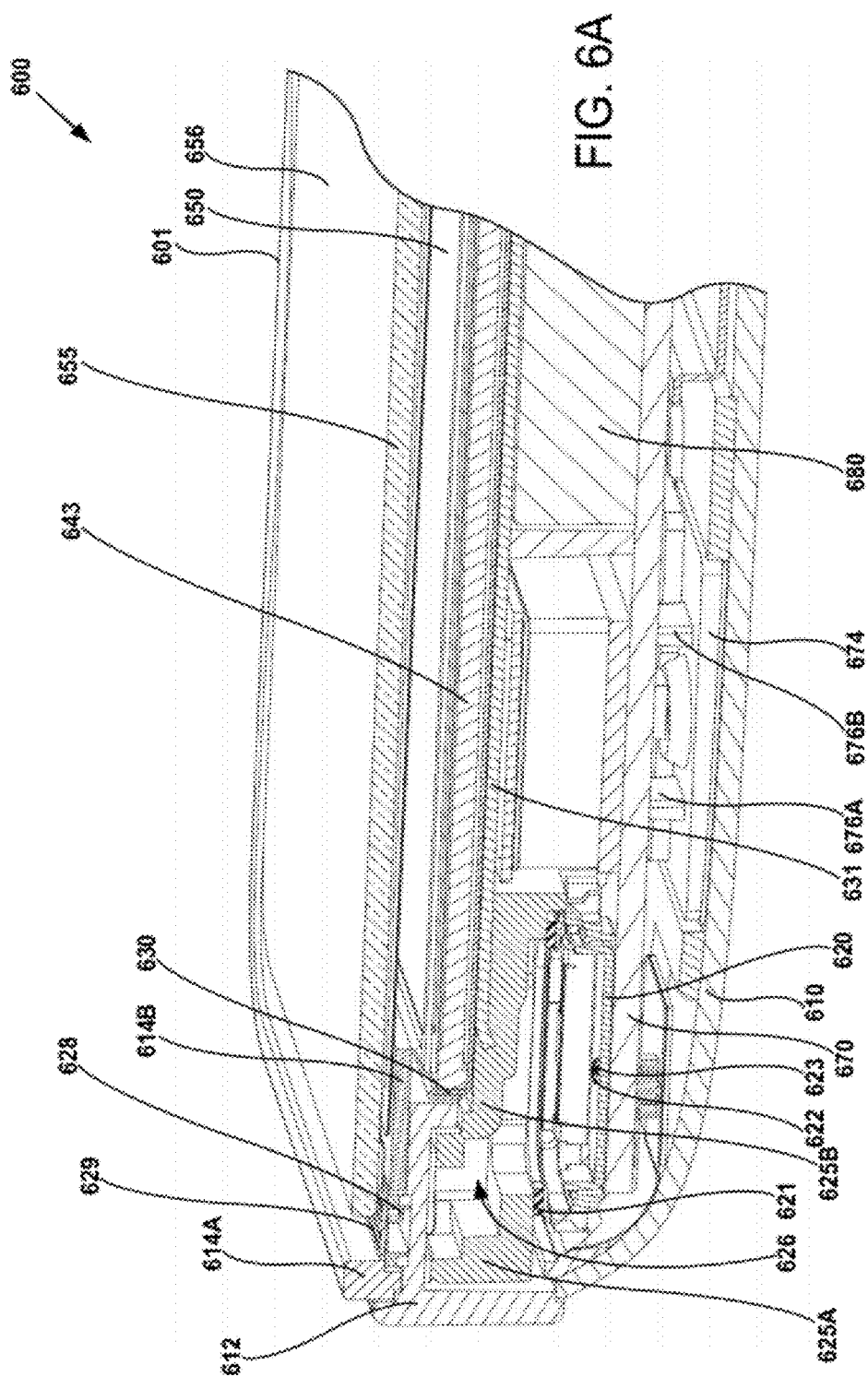

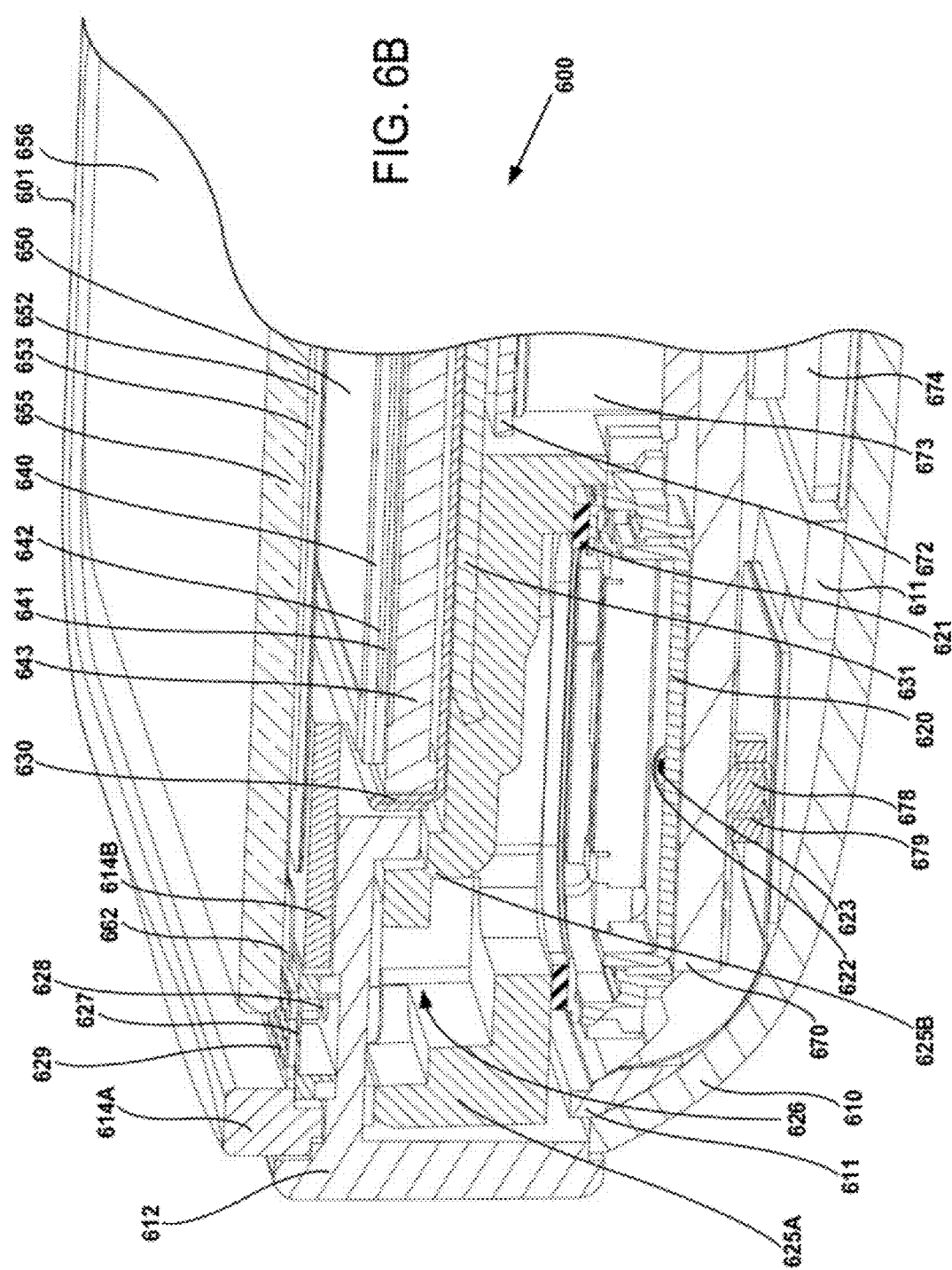

Radial measurement:

Axial measurement:

HEARING AID-COMPATIBLE APPARATUS FOR WIRELESS COMMUNICATION DEVICES

FIELD

The present disclosure pertains to apparatus and methods for enhancing mobile devices incorporating hearing aid compatible (HAC) devices and related communications technologies.

BACKGROUND

The Federal Communications Commission (FCC) initiated work on developing standards for compatibility between wireless communications devices and hearing aids in 1995. An early standard, ANSI C63.19-2001, entitled "American National Standard for Methods of Measurement of Compatibility between Wireless Communications Devices and Hearing Aids," was published by an FCC committee in 2001, and several versions have followed.

The ANSI C63.19 standards apply to both wireless communications devices and hearing aids, and set forth standardized methods for measurement and parametric requirements for ensuring operational compatibility and accessibility of hearing aids used with wireless communications devices, including cordless, cellular, personal communications service (PCS), and Voice over Internet Protocol (VoIP) phones, operating in frequency bands ranging from 800 MHz to 3 GHz.

In particular, the standards describe operating parameters for hearing aids operating in either an acoustic coupling mode or a telecoil (T-Coil) coupling mode mode. The standards includes techniques for measuring the following for wireless communications devices: RF electric-field emissions, RF magnetic-field emissions, T-coil mode magnetic-signal strength in the audio band, T-coil mode magnetic-signal frequency response through the audio band, and T-coil mode magnetic-signal and noise articulation index.

Electromagnetic emissions from wireless communication devices can interfere with hearing aid reception of a telecoil signal. A telecoil signal is typically transmitted via inductive coupling from a loop transmitter or a speaker to a telecoil (T-coil) designed to receive such inductive signals in an audio frequency band (e.g., a frequency band ranging from 300 to 3400 Hz). The standards also provide tests that can be used to assess the electromagnetic characteristics of hearing aids and wireless communications devices.

In telecoil mode, a hearing aid or other device detects a varying magnetic-field emitted by a speaker coil or specialized telecoil transmitter coupled to a wireless communications device. Using inductive coupling to transmit a signal is in contrast to earlier hearing aid devices, which simply amplify a received acoustic signal. Hearing aids operating in acoustic mode have performance issues, especially when operating in loud, crowded environments. Some hearing aids are able to operate in both an acoustic coupling mode and a T-coil mode, where the mode used is selected by a user (e.g., by pressing a switch or button on the hearing aid) or selected automatically (by detection of a suitable signal with a T-coil). By using a T-coil receiver, reception issues associated with amplifying an acoustic signal received using a microphone (e.g., audio feedback) can be minimized or avoided.

Several parameters can vary the amount of current, signal quality, and transmission distance achieved using a T-coil transmitter. For example, length of the coil, diameter of the coil, and the number of windings affect these performance parameters. For designs incorporating a speaker voice coil as the T-coil transmitter, aspects of the design of the nearby speaker magnet (e.g., magnet geometry or iron content) impact the shielding of the T-coil transmitter by the speaker magnet. In addition, the distance between a T-coil transmitter and receiver, as well as interference from nearby electrical systems (e.g., noise from internal signals in a smartphone or transmitted signals in an RF band, such as TDMA or GSM bands), also have an effect on the intensity and quality of the received electromagnetic field strength.

FIGS. 1A and 1B are a top view 100 and side view 130 of a wireless communication device (a cell phone 102) indicating various locations of telecoil receivers during experimental testing according to the ANSI C63.19-2007 standard. The cell phone 102 includes a liquid crystal display (LCD) 105, a microphone 109, and several holes in the cell phone housing that form an acoustic speaker port 108. An ear coupling cup 109 surrounds the speaker port 108. Not visible inside the housing of the cell phone 102 are a speaker 110 and a telecoil transmitter 112, whose locations are indicated by dashed circles. Magnetic field intensity (H-field) measurements are made by a telecoil receiver at the measurement reference point 120 indicated by an "x." Also shown are several test positions for a telecoil receiver, including an axial position 122, and two radial test positions 124 and 125. A telecoil receiver axis 140 used while the telecoil is in the radial test positions 124 and 125 is also shown. The measurement reference point 120 is at the intersection of a reference plane 142, which is located 10 mm above an outermost portion of the ear coupling cup 109 and the telecoil receiver axis 140. Notably, the telecoil transmitter 112 is placed at a distance above the LCD 105, in order to avoid the LCD from interfering with the inductive signal transmitted by the transmitter along the telecoil receiver axis 140.

FIGS. 2A and 2B are charts 200 and 250 that show the telecoil frequency response specified by ANSI C63.19-2007. The chart 200 in FIG. 2A is for wireless devices having a field strength attenuation of less than −15 dB A/m at 1 kHz. The X-axis is a log scale axis, showing frequency response over a range from 100 Hz to 10 kHz. The Y-axis indicates the magnetic field frequency response, in dB relative to the value at 1 kHz, ranging from −20 to +20 dB. A series of line segments 210 indicates the upper bound of the acceptable range, and the second series of line segments 211 indicates the lower bound of the acceptable range. Thus, the field intensity of the desired signal is measured at the center of an audio band (1 kHz), and subsequent measurements of the received field intensity are desirably located within the upper and lower bounds indicated across an audio band of 300 to 3400 Hz.

Similarly, FIG. 2B is a chart 250 of the frequency response specified by ANSI C63.19 for wireless devices having a field strength attenuation of greater than −15 dB A/m at 1 kHz. As shown, a first series of line segments 260 indicates the upper bound of the acceptable region, and a second series of line segments 261 indicates the lower bound of the acceptable region. The scales of the X- and Y-axes are the same as those in FIG. 2A. Similarly as in FIG. 2A, the field intensity of the desired signal is measured at the center of an audio band (1 kHz), and subsequent measurements of the received field intensity are desirably located within the upper and lower bounds indicated across an audio band of 300 through 3400 Hz.

FIGS. 3A and 3B are charts 300 and 350 for the cellphone 102 shown in FIGS. 1A and 1B. The measured magnetic field strength is plotted along the Y-axis over the corresponding applied transducer voltage, which is shown along the X-axis. The chart 300 in FIG. 3A indicates measured magnetic field strength for a telecoil receiver oriented in a radial position as shown in FIGS. 1A-1B. A line 310 indicates the minimum measured field strength as defined by the HAC ANSI C63.19-2007 specification. As shown, a line 320 corresponds to a telecoil receiver in a radial position (e.g., at radial position 124) at a distance of 11 mm from the reference plane 142. A line 321 corresponds to a radially-positioned telecoil at a distance of 13 mm. Finally, a line 322 corresponds a radially-positioned telecoil at a distance of 13 mm. As shown, the measured magnetic field strength decreases as the distance between the telecoil receiver and the telecoil transmitter 112 increases.

The chart 350 in FIG. 3B indicates a measured magnetic field strength for a telecoil receiver oriented in an axial position 122 as shown in FIGS. 1A-1B. A line 360 indicates the minimum measured field strength as defined by the HAC ANSI C63.19-2007 specification. As shown, a line 370 corresponds to a telecoil receiver in an axial position 122 at a distance of 11 mm from the reference plane 142. A line 371 corresponds to a radially-positioned telecoil at a distance of 13 mm. Finally, a line 372 corresponds a radially-positioned telecoil at a distance of 13 mm. As shown, the measured magnetic field strength decreases as the distance between the axial-positioned telecoil receiver and the telecoil transmitter 112 increases.

As wireless communications device form factors shrink and the number of features and functions incorporated in these devices increases, developing wireless devices that deliver a desired form factor and functionality while also complying with hearing aid compatibility standards is increasingly difficult. Therefore, there exists ample opportunity for improvement in technologies to realize wireless devices having desirable form factors, functionality, and HAC compatibility.

SUMMARY

Apparatus and methods are disclosed for hearing aid-compatible audio communication applications of wireless devices, including cordless, cellular, personal communications service (PCS) phones, Voice over Internet protocol (VoIP) devices, handheld devices, handheld computers, smartphones, and PDAs. The disclosed technology has further applicability to data communication applications, such as those employing electronic article surveillance and radio-frequency identification systems.

The disclosed technologies include apparatus and methods incorporating a wireless transmitter, a display (e.g., an LCD display), and a display frame constructed using selected materials (e.g., non-ferromagnetic materials such as austenitic stainless steel) and positioned in a manner to reduce or even improve transmission of an electromagnetic signal from a transmitter to a telecoil receiver.

According to a first embodiment, a wireless communication apparatus comprises a display having a top viewing surface and bottom surface, a transmitter for outputting a signal suitable for a hearing aid receiver, the transmitter being positioned underneath at least a portion of the bottom surface of the display, and a layer of non-ferromagnetic material interposed between the transmitter and at least a portion of the bottom surface of the display. In some examples, the non-ferromagnetic material comprises austenitic stainless steel and the non-ferromagnetic material is coupled to the bottom surface of the display to be a support layer for the display. In some examples, the relative magnetic permeability of the non-ferromagnetic material is not greater than 1.01. In some examples, the wireless communication apparatus further comprises a housing, where the transmitter, the non-ferromagnetic layer, and at least the bottom surface of the display are positioned inside the housing, the bottom surface of the display and the top viewing surface of the display are substantially parallel. The wireless communication apparatus can also have a receiving region defining an area of space outside the housing for a user to place the hearing aid receiver in proximity with the apparatus, wherein the transmitter is operable to non-acoustically couple with a telecoil located in the receiving region.

In some examples the wireless communication apparatus comprises an acoustic speaker having a speaker coil, wherein the speaker coil acts as a transmitter, and operable to produce an inductive signal.

In some examples, the wireless communication apparatus further comprises an acoustic speaker for producing an acoustic signal, wherein the transmitter is an inductive coil that is not for producing the acoustic signal, wherein the transmitter is wired in series with the speaker coil.

The area of the transmitter positioned underneath at least a portion of the bottom surface of the display can be varied in order to suit a particular HAC-friendly application. In some examples, the area of the transmitter positioned underneath a portion of the bottom surface of the display is 10%, but can also be 20%, 30%, 50%, 100%, or any selected area between 10% and 100%, based on the application.

According to a second embodiment, a wireless communication apparatus has a first axis and a second axis, wherein the first axis is perpendicular to the second axis. The apparatus comprises a transmitter, a display, the display having a substantially planar bottom surface, the display being configured when the apparatus is in an operable position such that the first axis is substantially parallel to the bottom surface of the display, and a layer of non-ferromagnetic material, wherein the transmitter, the display, and the non-ferromagnetic layer are each configured such that when the apparatus is in the operable position the second axis passes through at least a portion of the transmitter, at least a portion of the bottom surface of the display, and at least a portion of the non-ferromagnetic layer.

In some examples, the wireless communication apparatus further comprises a housing, where the transmitter, the non-ferromagnetic layer, and at least the bottom surface of the display are positioned inside the housing, where the housing includes a low-carbon material, the low-carbon material being selected such that it does not substantially interfere with transmission between the transmitter and a hearing aid receiver positioned outside the housing.

In some examples, the wireless communication apparatus further comprises a housing having a top surface and a speaker port, the speaker port being located on the top surface of the housing, where at least a portion of the top surface of the housing is substantially parallel with top surface of the display and the speaker port does not overlap the non-ferromagnetic layer. In some example, the wireless communication apparatus includes a backing covering at least a portion of the bottom surface of a liquid crystal display (LCD).

In some examples, the transmitter is a speaker coil, while in other examples the transmitter is an inductive coil that is not part of a speaker. In some examples, the non-ferromagnetic material comprises austenitic stainless steel, and the wireless communication device further comprises a backlight for the display, a transparent cover for the display, an acoustic cavity, the acoustic cavity having at least one speaker port, where the speaker port is not intersected by the second axis, a housing, wherein the housing is made of a low-carbon material for avoiding interference with a hearing aid, and a touch screen sensor below the transparent cover.

In some examples, the display is configurable to be positioned such that the first axis is substantially parallel to the top surface during operation of the transmitter.

According to a third embodiment, a method of operating a wireless transmitter including the acts of producing a communication signal, transmitting an inductive signal from the transmitter through a layer of non-ferromagnetic material substantially parallel to a viewing surface of an electronic display, and receiving the inductive signal using an electromagnetic receiver, where the inductive signal is based on the communications signal and the non-ferromagnetic layer is at least partially interposed between the electronic display and the transmitter.

In some examples the communication signal is an audio signal and the electromagnetic receiver is a telecoil in a hearing aid. In some examples, the communication signal is a data signal and the electromagnetic receiver is a radio-frequency identification (RFID) receiver. In some examples, the communication signal is a data signal and the electromagnetic receiver is an electronic article surveillance receiver.

The foregoing and other objects, features, and advantages of the invention will become more apparent from the following detailed description, which proceeds with reference to the accompanying figures.

BRIEF DESCRIPTION OF THE DRAWINGS

FIGS. 1A and 1B are a top view and a side view, respectively, of an arrangement for testing for HAC compatibility according to the prior art.

FIGS. 4A and 4B are a top view and a side view, respectively, of smart phone in accordance with the disclosed technology.

FIG. 4C is an internal top view showing the relationship between a speaker transmitter and a layer of non-ferromagnetic materials in the smart phone depicted in FIGS. 4A and 4B.

FIG. 6A is a cross-sectional view of an exemplary smart phone that is a HAC-compatible wireless communication device. FIG. 6B is an enlarged view of a portion of the cross-sectional view shown in FIG. 6A.

DETAILED DESCRIPTION

Figure 2A:
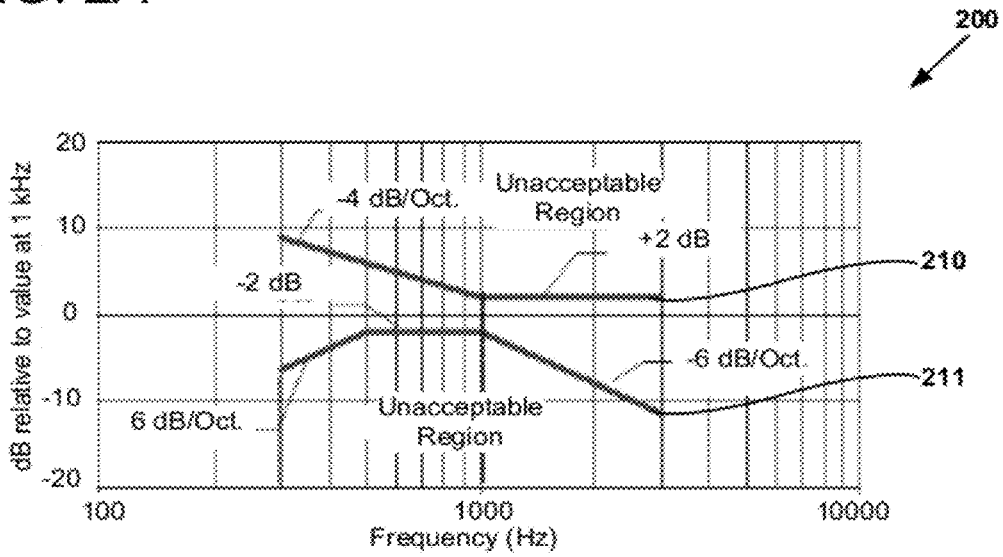
FIGS. 2A and 2B are graphs showing unacceptable ranges of frequency response according to ANSI standard C63.19-2007.
Figure 2B:
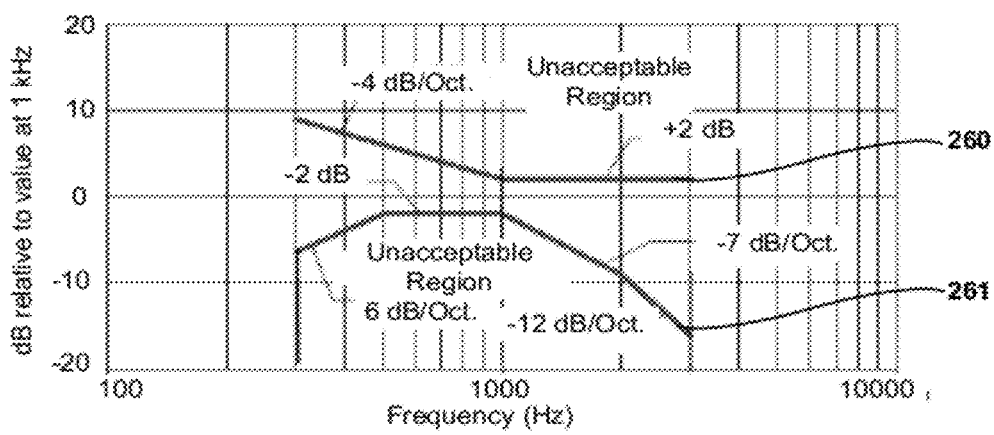
Figure 3A:
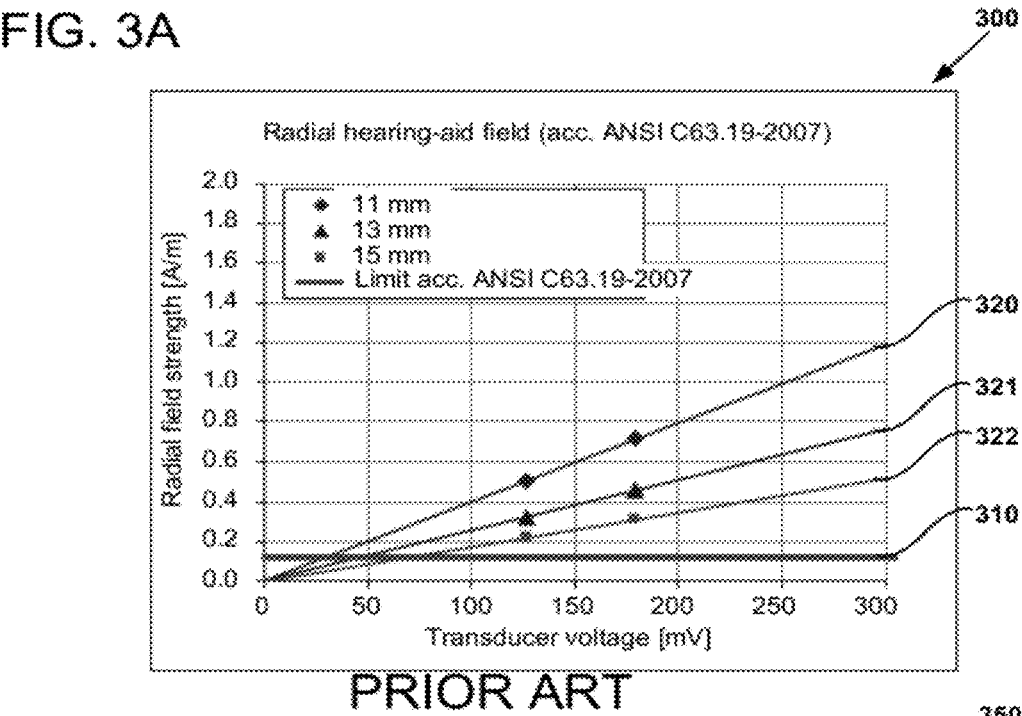
FIGS. 3A and 3B are graphs showing measured field strength for the arrangement depicted in FIGS. 1A and 1B.
Figure 3B:
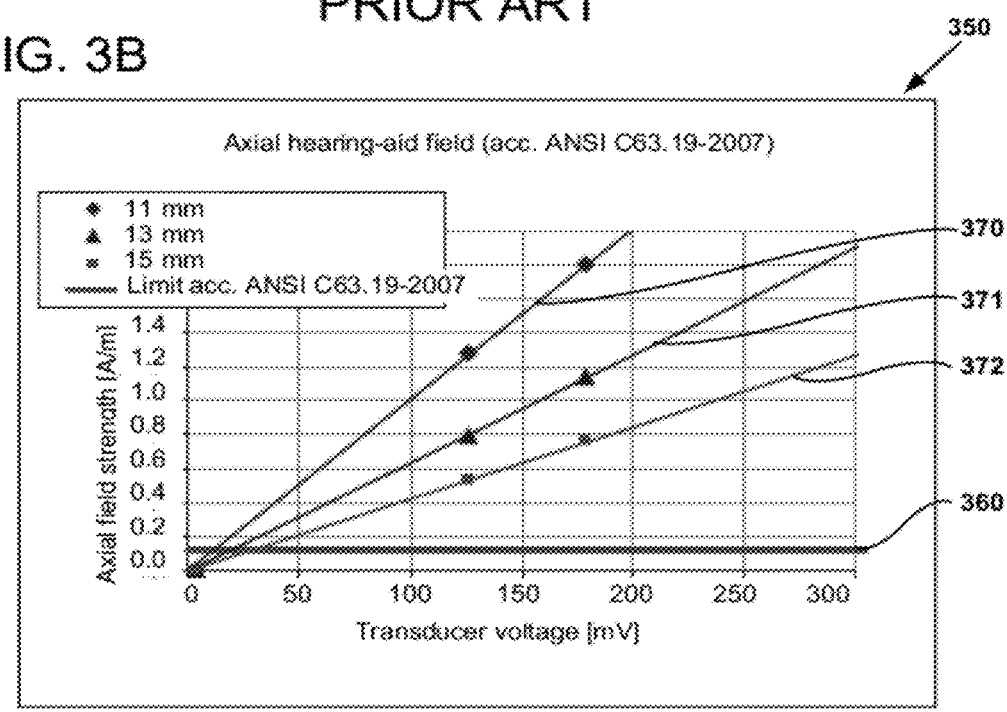

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In the following description, language describing a device as "being in an operable position" may be used. Such language refers to a device, such as a wireless communications device that may have re-positionable assemblies, for example, a flip-phone, slider-phone, or swivel phone. Such devices typically include the ability to position components in an operable position (e.g., for listening to acoustic audio produces by a speaker), and these positions are typically also employed by hearing-aid users using HAC-friendly communications devices. Thus, a wireless communication device is not in an operable position when positioned such that a user cannot easily use the device as a HAC-friendly communication device.

The terms "axis" or "axes" describe imaginary lines used describe relative relationships amongst objects, but these terms do not refer to actual physical objects.

I. Example Wireless Communication Device

FIG. 4A is a top view 400 and FIG. 4B is a side view 405 of a wireless communication device 410 in accordance with the disclosed technology. In this particular example, the wireless communication device 410 is a smart phone, but other wireless communication devices can be used. As shown, the wireless communication device 410 includes a speaker port 412, a display 415 having a top viewing surface 416, a bottom surface 413 opposite the top view surface, and several hardware buttons 417-419. The location of a speaker assembly 426 is indicated by a dashed oval. The speaker assembly 426 includes a speaker coil 425 that is operable to function as a hearing aid-compatible electromagnetic transmitter. Also shown is the location of a layer 424 of non-ferromagnetic material (e.g., austenitic stainless steel, aluminum, copper, or platinum), which forms a frame for supporting the back of the LCD display. A region 440 of space is indicated for a designated HAC reception zone. As shown in FIGS. 4A and 4B, a substantial portion of the non-ferromagnetic layer 424, speaker assembly 426, and the speaker coil 425 are positioned underneath the top viewing surface 416 and bottom surface 413 of the display 415. The layer 424 of non-ferromagnetic material can be coupled to and coextensive with the bottom surface of the display. Alternatively, the non-ferromagnetic material can cover less than all of the bottom surface of the display. In any event, the non-ferromagnetic material provides a supportive backing structurally strengthening the display.

Also shown is a first axis 441 (Y-axis), a second axis 442 (Z-axis), and a third axis 443 (X-axis), all of which are imaginary lines used to conveniently indicate the relative positions of components of the smart phone 410. The speaker assembly 426, speaker coil 425, and speaker magnet are shown centered about the crossing point of the first axis 441 and third axis 443. For example, the top viewing surface 416 is substantially parallel to a plane formed by the first axis 441 and a third axis 443. Furthermore, the first axis 441 is perpendicular to the second axis 442 and the third axis 443, and the second axis 442 is perpendicular to the third axis 443. The second axis 442 passes through an area where the display 415, transmitter 426, and layer 424 overlap.

Not shown is a proximity sensor. The proximity sensor can be used to detect when the smart phone 210 user's ear is near the smartphone, so that the backlight for the display can be turned off. Turning off the backlight improves battery life and also reduces electromagnetic interference with the telecoil signal that can be caused by the backlight.

FIG. 4C is an internal top view 450 that further illustrates the arrangement of certain components of the wireless communication device 410 illustrated in FIGS. 4A and 4B. As shown, the speaker assembly 426 includes the speaker magnet (stator) 460, the speaker coil 425, which acts as a transmitter, and the non-ferromagnetic layer 424. The portion of the speaker coil 425 that is underneath the non-ferromagnetic layer 424 is shown as a hatched area 470. As shown, the top edge 472 of the non-ferromagnetic layer 424 is aligned on top of the diameter of the speaker coil 425. Thus, 50% of the area of the transmitter (i.e., the speaker coil 425) is underneath the non-ferromagnetic layer 424. As will be understood by one of ordinary skill in the art, the amount of area of the speaker coil 425 that positioned underneath the non-ferromagnetic layer 424 can be adjusted for a particular HAC-friendly application. In some examples, only 10% of the area of the speaker coil 425 is underneath the non-ferromagnetic layer 424, while in others, 25%, 50%, 75% or 100% of the speaker coil 425 can be positioned underneath the non-ferromagnetic layer 424.

As shown in FIG. 4C, the speaker assembly 426 includes a stationary speaker magnet 460 and a speaker coil 425, which acts as a telecoil transmitter, and which is attached to a membrane of material (e.g., cloth, plastic, or paper), and vibrates up and down along the Z-axis when an audio signal is applied to the terminals of the speaker assembly. In other examples, the speaker coil 425 can be stationary and the speaker magnet 460, which vibrates, is attached to a membrane of material. The shape of the elements of the speaker assembly 426 can also be adjusted. For example, the shape can be square, octagonal, or rectangular. In some examples of wireless communication devices 410, a piezoelectric speaker without a speaker coil is used. For those examples, a separate coil, which is not part of the speaker assembly, is employed as a transmitter for sending an inductive signal to a hearing aid telecoil. In those examples, the separate coil, which acts as the hearing-aid transmitter, can be positioned underneath at least a portion of the layer of non-ferromagnetic material.

The use of a non-ferromagnetic layer as the backing for the LCD provides several advantages. For example, using a material such as austenitic stainless steel provides rigidity to the LCD. In addition, and as will be discussed further below, the non-ferromagnetic layer can be positioned such that it does not interfere with inductive signals sent from the speaker coil 425 (which acts as a telecoil transmitter) to a hearing aid receiver. This allows the speaker assembly 426 to be positioned at least partially underneath the LCD, which allows for a more compact design for the smartphone 410 without sacrificing hearing-aid performance in telecoil mode, since the length of the smartphone can be reduced along the Y-axis as shown in FIGS. 4A-4C, and in comparison to the cell phone 102 shown in FIGS. 1A-1B. Another advantage of using a non-ferromagnetic backing is that a combined speaker that uses its speaker coil as a transmitter can be used in a compact form factor, instead of using a separate speaker and dedicated telecoil.

II. Example Smartphone

Figure 5:
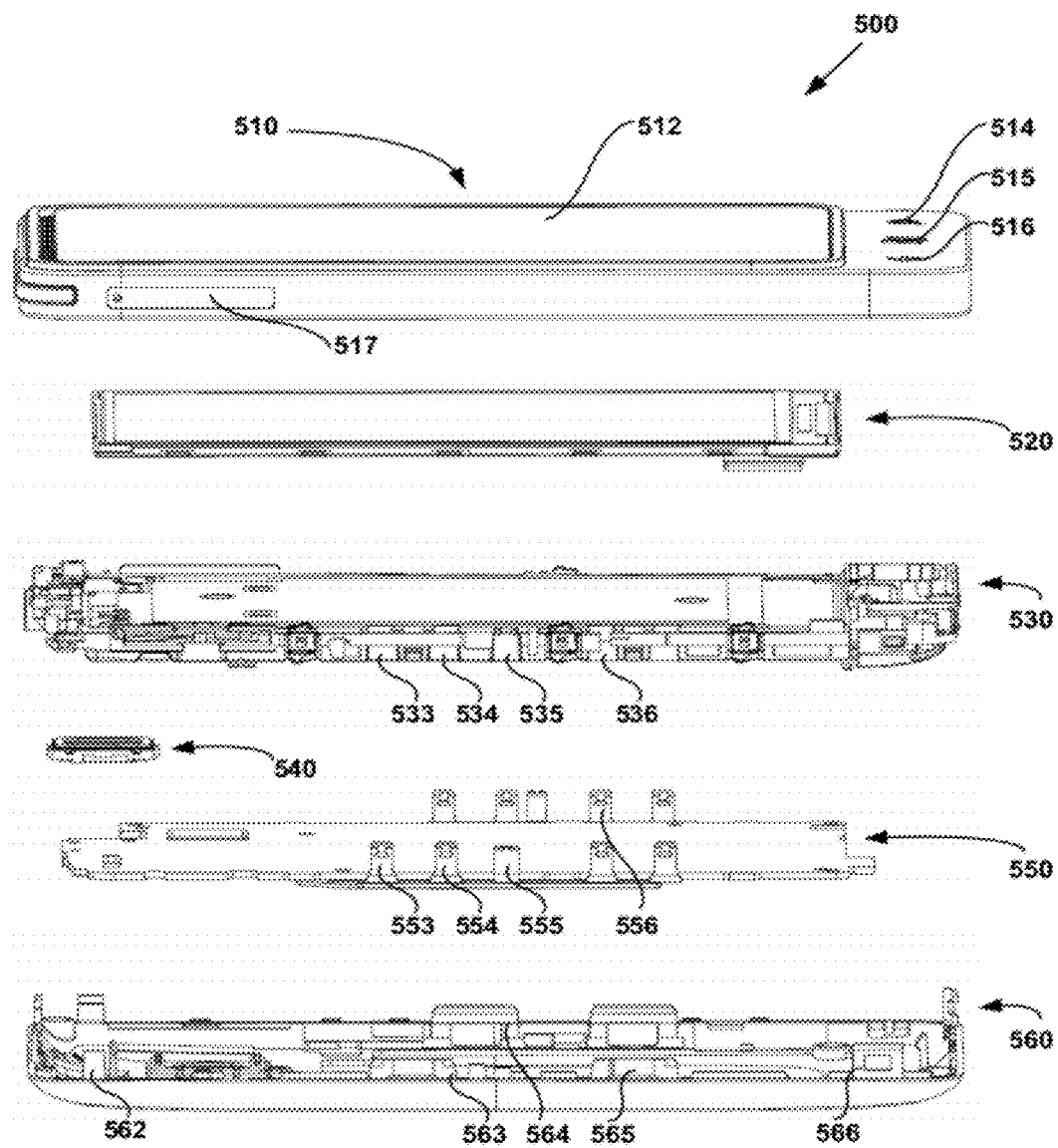
FIG. 5 is an exploded view of an exemplary apparatus in accordance with the disclosed technology.

FIG. 5 is an exploded view 500 of a HAC-compatible smartphone that depicts several sub-assemblies of the smartphone. A top cover housing 510 includes a glass cover or lens for a touch-screen LCD display 512, and several input buttons 514-517. Located below the top cover housing 510 is a backlit LCD display 520. Located below the LCD display 520 is a mid-frame assembly 530, which attaches to several internal components of the smartphone 510. The mid-frame assembly 530 includes several mounting slots, for example, slots 533-536, for mechanically interfacing with other sub-assemblies of the smartphone.

Located below the mid-frame assembly 530 is a speaker assembly 540, which includes a speaker driver with a speaker coil, a plastic membrane forming a speaker cone, and a gasket for coupling the speaker assembly with the smartphone. The speaker assembly is able to couple with a hearing aid via both acoustic coupling (e.g., by producing sound output) as well as via magnetic coupling (e.g., by producing a magnetic signal through the operation of the speaker driver, inducing a signal in a telecoil receiver of a hearing aid). The speaker assembly 540 can also be referred to as a telephone handset "receiver," according to long-standing convention, but as used herein will be typically referred to as a speaker, a transmitter, or a transducer.

Located below the mid-frame assembly 530 and speaker assembly 540 is a printed circuit board (PCB) 550, which includes electromagnetic interference (EMI) shields and several mounting tabs (e.g., mounting tabs 553-556) that can be used to secure the PCB to the mid-frame assembly. The PCB 550 also includes conducting interconnect wires for connecting electronic components included in the smartphone, and has several electronic components, such as integrated circuits and passive devices, attached thereto.

Located below the PCB is a rear housing assembly 560, which includes several plastic tabs 562-566 for attaching the rear housing assembly to the mid-frame assembly 530 and top cover housing 510.

FIGS. 6A and 6B are cross-sectional views 600 of an exemplary smartphone 601 (an example of a HAC-compatible wireless communication device). FIG. 6B is an enlarged view of a portion of the cross-sectional view shown in FIG. 6A. For purposes of this application, FIGS. 6A and 6B are not discussed separately herein.

As shown, the smartphone 601 includes a bottom plastic housing 610 that is molded to an internal portion 611 of the housing, which is also made of plastic and is fused to the bottom plastic housing 610 via molecular bonding. The front housing 612 is also made of plastic, and is attached to a portion 614A and 614B of aluminum trim. The front housing 612 is desirably made of a low-carbon content plastic to avoid interference with cellular, GPS, Wi-Fi, or hearing aid electromagnetic signals.

Also shown is a cross section of a speaker assembly 620. As discussed above regarding speaker assembly 540, the speaker assembly 620 includes a speaker driver (stator) 623 surrounded by a speaker coil 622, which acts as a transmitter for sending an inductive signal to a hearing aid telecoil. Other components of the speaker assembly 620 include a plastic membrane forming a speaker cone, and a gasket for coupling the speaker assembly with the smartphone. These other components are not depicted here for simplicity. The speaker coil 622 of the speaker assembly 620 acts as a transmitter, because it produces an electromagnetic wave that is operable to induce a magnetic field in a receiver (such as a hearing aid receiver). The speaker assembly 620 is able to couple with a hearing aid via both acoustic coupling (e.g., by producing sound output) as well as via magnetic coupling (e.g., by producing a magnetic signal through the operation of the speaker driver, inducing a signal in a telecoil receiver of a hearing aid). In other examples, a separate speaker and a hearing aid transmitter (positioned away from the speaker driver) are used.

To improve the effectiveness of the speaker driver 620 as an audio output source, it is coupled with a plastic speaker frame (which includes portions 625A and 625B) that forms a cavity 626 that is coupled to a speaker port 628. The speaker assembly 620 is coupled to the speaker frame 625A 625B with a gasket 621. The speaker port 628 includes a hole in the front housing 612, thus forming an acoustic pathway from the speaker assembly 620 to the exterior of the smartphone 601. A speaker grill 629 and acoustic mesh 627 cover the speaker port 628 and help prevent debris and moisture from entering the cavity 626 and damaging the speaker assembly 620.

The smartphone 601 also includes an LCD assembly (which is an example of a display). The LCD assembly includes an austenitic stainless steel tray 630 that provides support for a bottom portion of the LCD assembly, including a light guide 643 with a reflective sheet backing. The austenitic stainless steel tray 630 also forms a layer of non-ferromagnetic material interposed between the speaker assembly 620 and the LCD assembly. A top surface 650 of the LCD assembly is the top surface of a polarizer film layer 642, which is secured within the LCD assembly with a plastic frame 640. The LCD assembly also includes a second polarizer film layer 641. The LCD assembly also has a bottom surface (not shown) that is substantially planar and coextensive with the lower surface of the light guide 643. Thus, in FIG. 6B, the language "bottom surface of the LCD assembly" describes the portion of the light guide 643 facing the larger planar portion of the austenitic stainless steel tray 630. The LCD assembly also includes other components not explicitly depicted, including a glass color filter, a glass array, and a diffuser sheet. The components of the LCD assembly can be attached using any suitable method, such as with screws, adhesive, or adhesive tape. As used herein, a "top viewing surface" means a top surface of a display that is intended for viewing (e.g., top viewing surface 656).

Located above the LCD assembly of the smartphone 601 is a glass cover 655, and two touch sensor layers 652 and 653 of a capacitive touch screen sensor, which can be used to detect one or more finger or stylus presses on the top viewing surface 656 of the glass cover 655. Also depicted are a flexible printed circuit 662 that couples the touch sensor layers 652 and 653 to electronic components within the smartphone 601.

A second austenitic stainless steel sheet 631 forms another layer that is attached and substantially coextensive to the austenitic stainless steel tray 630. The second austenitic stainless steel sheet 631 provides additional support for the LCD assembly. The materials for both the stainless steel sheet 631 and the stainless steel tray 630 are selected such that the transmitter within the speaker assembly 620 can be positioned at least partially underneath the top viewing surface 656 of the display and the interposed stainless steel components 630 and 631 without interfering with reception of an electromagnetic signal by a hearing aid telecoil. As used herein, austenitic stainless steel refers to a steel alloy having non-ferromagnetic properties, for example, stainless steels from the 300 series, such as 301, 302, 303, 304, 310, 316, 316L, 317, 321, 347, or 21-6-9 series, can be employed. Table 1 lists the relative magnetic permeability of several materials measured at an applied external magnetic field H of 5 kA/m. Some of the materials listed are not suitable for use as a non-ferromagnetic layer according to the apparatus and methods disclosed herein, but are listed in Table 1 for illustrative purposes. Magnetic permeability is a property of materials modifying the action of magnetic poles placed therein and modifying the magnetic induction resulting when the material is subjected to a magnetic field or magnetizing force. The relative magnetic permeability means the ratio of the magnetic induction in the substance to the magnetizing field to which it is subjected. The relative magnetic permeability of a vacuum is 1.000. The stainless steel designations are those of the American Iron and Steel Institute.

TABLE 1

| Material | Relative magnetic permeability at H = 5 kA/m |
| --- | --- |
| 301 Stainless Steel (Austenitic) | 1.003 |
| 304 Stainless Steel (Austenitic) | 1.004 |
| 310 Stainless Steel (Austenitic) | 1.002 |
| 316 Stainless Steel (Austenitic) | 1.003 |
| 317 Stainless Steel (Austenitic) | 1.003 |
| 321 Stainless Steel (Austenitic) | 1.003 |
| 347 Stainless Steel (Austenitic) | 1.004 |
| 21-6-9 Stainless Steel (Austenitic) | 1.002 |
| 416 Stainless Steel (Martensitic) | 700-1000 |
| 430 Stainless Steel (Martensitic) | 600-1000 |
| Nickel | 100-600 |
| Platinum | 1.000265 |
| Aluminum | 1.000022 |
| Copper | 0.999994 |
| Ferrite (Nickel zinc) | 16-640 |
| Ferrite (Manganese zinc) | >640 |
| Electrical Steel | 4,000 |
| High purity iron | 1,500 |
| Armco iron | 7 |

As shown in Table 1, the relative magnetic permeability of materials employed are desirably less than 1.01, and suitable grades of stainless steel include those with relative permeabilities less than 1.005.

In particular, a stainless steel tray 630 fabricated from 301 series stainless has been observed as having desirable physical and magnetic properties for HAC-compatible applications according to the disclosed technology. The relatively larger planar portion of the stainless steel tray 630 forms a support for the LCD assembly and forms a layer of non-ferromagnetic material. The non-ferromagnetic properties of austenitic stainless steel are due at least in part to the low carbon content of the steel alloy employed. In other examples, other non-ferromagnetic or non-magnetic materials can be used instead of austenitic stainless steel.

The smartphone 601 also includes a printed circuit board (PCB) 670, which couples the speaker assembly 620, a SIM card 672, a camera 673, and a battery 680. Aluminum camera supports (e.g., supports 676A and 676B) provide support for the camera housing 674, which houses a camera lens and a flash lens. Also shown are electrical connectors 678 and 679, which couple the touch sensor to the printed circuit board 670.

III. Example Method of Operating a Wireless Transmitter

Figure 7:
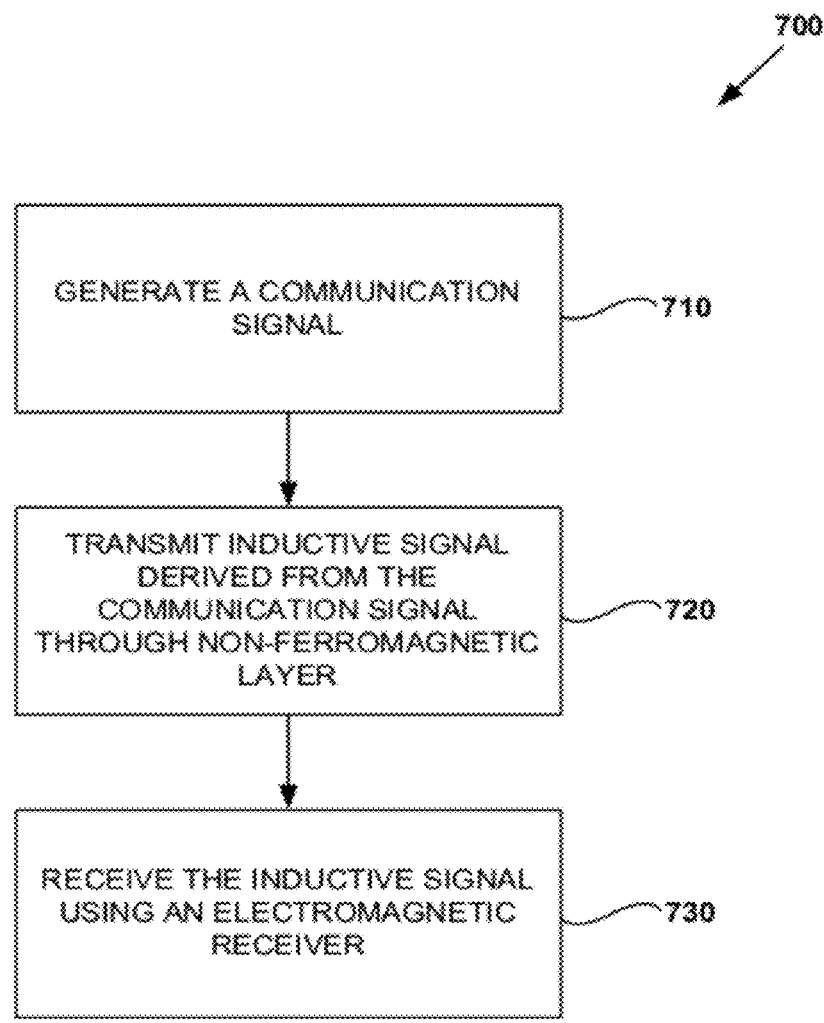
FIG. 7 is a flow chart that outlines an exemplary implementation of the disclosed technology.

FIG. 7 is a flow chart 700 outlining an example method of operating a wireless transmitter.

At process block 710, a communication signal is generated for data to be transmitted using an inductive transmitter. The communication signal can be an audio signal generated using a microphone, an audio signal received via TDMA or GSM, an audio signal generated from data stored in computer storage, a radio signal, an RFID interrogation signal, an electronic surveillance device interrogation signal, or other suitable communication signal.

At process block 720, an inductive signal is derived from the communication signal by applying the communication signal to a telecoil, speaker voice coil, or other suitable transmitter. For example, a baseband audio communication signal can be applied directly to a speaker voice coil operable to act as a transmitter. In other examples, an RF communication signal can be converted to a baseband audio signal that is applied to the speaker voice coil. The inductive signal is transmitted through a layer of non-ferromagnetic material (e.g., austenitic stainless steel) that is substantially parallel to a top viewing surface of an electronic display (e.g., an LCD display). The non-ferromagnetic layer is positioned such that the layer is at least partially interposed between the transmitter and at least a portion of the bottom surface of the display.

At process block 730, the inductive signal is received using an electromagnetic wireless receiver that can detect changes in the magnetic signal strength induced by the wireless transmitter. The wireless receiver can be, for example, a hearing aid telecoil, and RFID receiver, or an electronic article surveillance receiver.

IV. Example Test Environment and Experimental Results

Figure 8A:
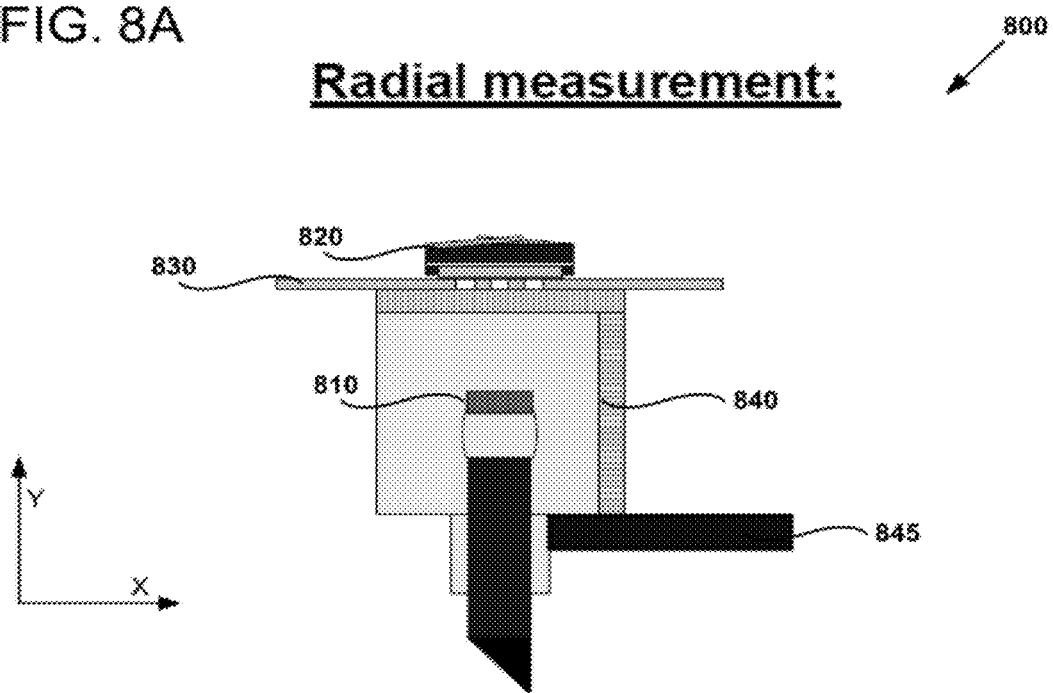
FIGS. 8A and 8B are schematic diagrams of an arrangement for measuring magnetic field strength received using a radial-oriented and an axial-oriented telecoil receiver.
Figure 8B:
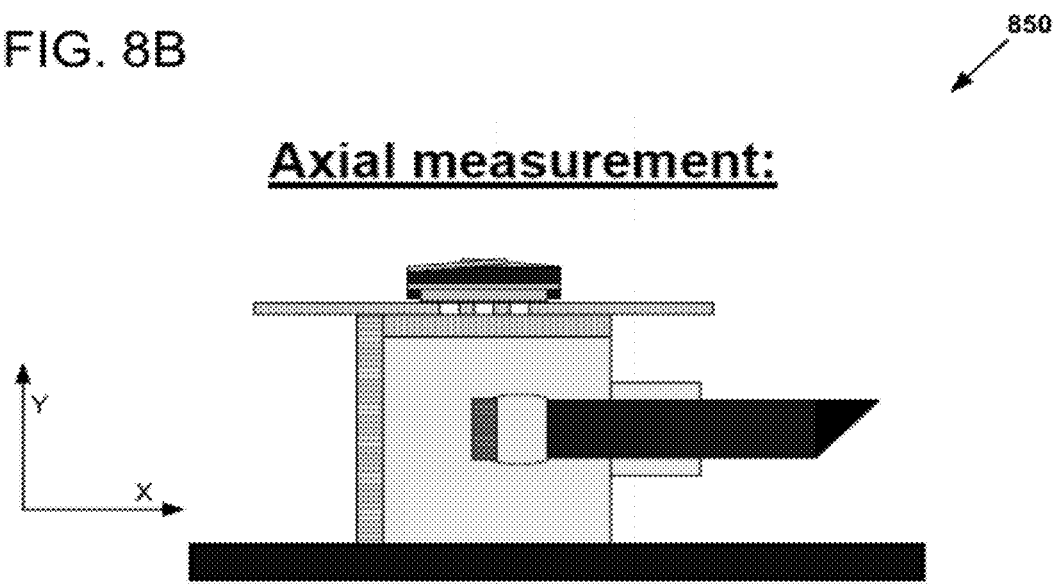

FIGS. 8A and 8B are schematic diagrams 800 and 850 illustrating a test environment for measuring electromagnetic field intensity while varying transmitter power, transmitter distance, effects of potentially signal shielding materials, and the position of a receiving "probe" telecoil. For testing purposes, it is desirable to use a telecoil that has the maximum dimensions established by a specification (e.g., the HAC ANSI C63.19-2007 specification, with maximum telecoil dimensions as shown in the schematic of FIG. 9A).

FIG. 8A is a schematic diagram 800 depicting a field intensity measurement with a telecoil 810 in a radial position. As shown, a speaker 820 is placed on a board 830 having several speaker ports (e.g., holes in the board) to allow audio output from the speaker. The board is mounted to a frame, which in turn is mounted to a table. The materials for the board, frame, and table are selected so as offer minimal interference to the inductive signal produced by the speaker. For example, the materials used for the board, frame, and table can include plastics, epoxies, cardboard, wood, fiberboards, or other suitable materials. A 1 kHz sinusoidal signal is applied to the speaker, and the received field intensity at the telecoil is measured using, e.g., an audio analyzer, which can measure the voltage change across the telecoil terminals over an audio frequency range. A model ATS-1 audio analyzer, which is sold by Audio Precision, is an example of a suitable audio analyzer for performing the telecoil measurements, including received field intensity and frequency response, disclosed herein. By using boards 830 of varying thickness, the distance between the speaker 820 and the telecoil 810 can be varied (e.g., to create speaker to telecoil distances of 11, 13, and 15 mm). The total speaker-to-telecoil distance can be determined by using a fixed distance (e.g., of 10 mm from probe to bottom surface of the board) with varying thickness of the board (e.g., using 1, 3, and 5 mm thick boards at a distance of 10 mm produces a speaker to telecoil distance of 11, 13, and 15 mm, respectively). The amount of power applied to the speaker can also be varied for testing. The telecoil in FIG. 8A can also be rotated around the Y-axis at multiple positions (e.g., four positions 90 degrees apart) and the measured field intensity averaged. In addition, a frequency response measurement can also be performed, by sweeping the frequency of a sinusoidal signal applied to the speaker 820 and comparing the received frequency response to the baseline response at a selected frequency (e.g., using a baseline of 1 kHz). Example results for similar radial field intensity measurements are discussed in FIG. 10A and accompanying text.

FIG. 8B is a schematic diagram 850 depicting a field intensity measurement of a telecoil in an axial position. Similar to the tests described above for FIG. 8A, the probe telecoil can be rotated around the X-axis to perform multiple measurements. Example results for similar axial field intensity measurements are discussed in FIG. 10B and accompanying text. In some cases, it may be simpler to perform frequency response positions for only a single axial position.

Figure 9A:
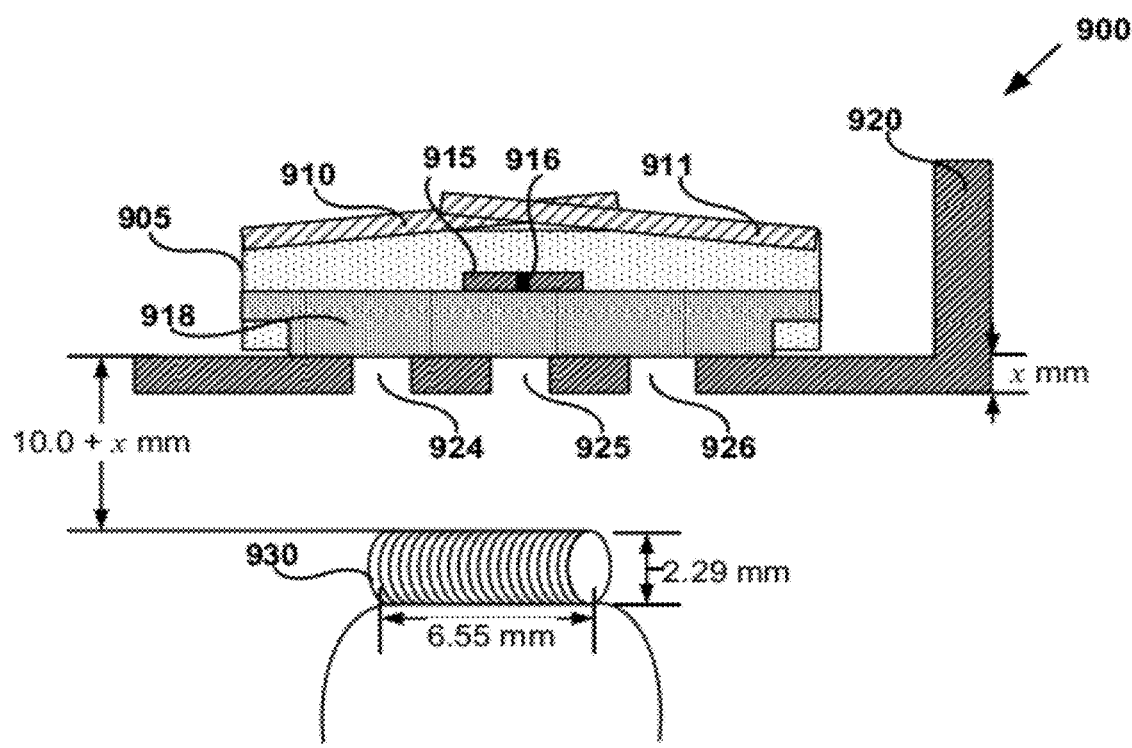
FIGS. 9A-9C are schematic diagrams of apparatus for measuring magnetic field strength received using a radial-oriented and an axial-oriented telecoil receiver.

FIG. 9A is a schematic diagram 900 of an exemplary arrangement for testing a hearing aid telecoil receiver with a speaker transmitter. As shown, a speaker 905 includes speaker input terminals 910 and 911 for applying an electrical signal to the speaker. A speaker coil 915 and a speaker magnet 916 (stator) are also depicted. A mounting frame 918 is used to mount the speaker to a mounting board 920. The mounting board 920 can be made of any suitable materials, such as plastic, wood, fiberboard, or other suitable material. The mounting frame 918 also encloses a speaker cone, which is a membrane that attaches to the moving speaker coil and creates acoustic waves responsive to movement of the speaker coil 915 (speaker cone not shown for simplicity). The speaker 905 is attached to a mounting board 920 that has several holes 924, 925, and 926, which act as acoustic ports, allowing passage of acoustic energy produced by the speaker. As shown, the thickness x of the mounting board can be varied to obtain varying measurements, as discussed at FIGS. 8A-8B and accompanying text. Electrical current in the speaker coil creates an electromagnetic field, thereby inducing current in a receiving telecoil 930, which is positioned 10 mm from the bottom surface of the mounting board 920. The receiving telecoil 930 comprises a rod wrapped with a wire coil, forming a magnetic dipole receiver. The receiving telecoil has maximum dimensions under the ANSI C63.19-2007 specification of 6.55 mm length and 2.29 mm diameter thickness. The length, thickness, and other parameters of the telecoil can be varied as needed for a particular application. Thus, using the arrangement depicted in FIG. 9A, baseline measurements of field intensity and/or frequency response measurements received at the telecoil can be performed. Thus, operating conditions of a speaker in a smart phone (e.g., of the speaker assembly 620 of the smartphone 610 shown in FIG. 6B) can be readily simulated before manufacturing the final smartphone product.

Figure 9B:
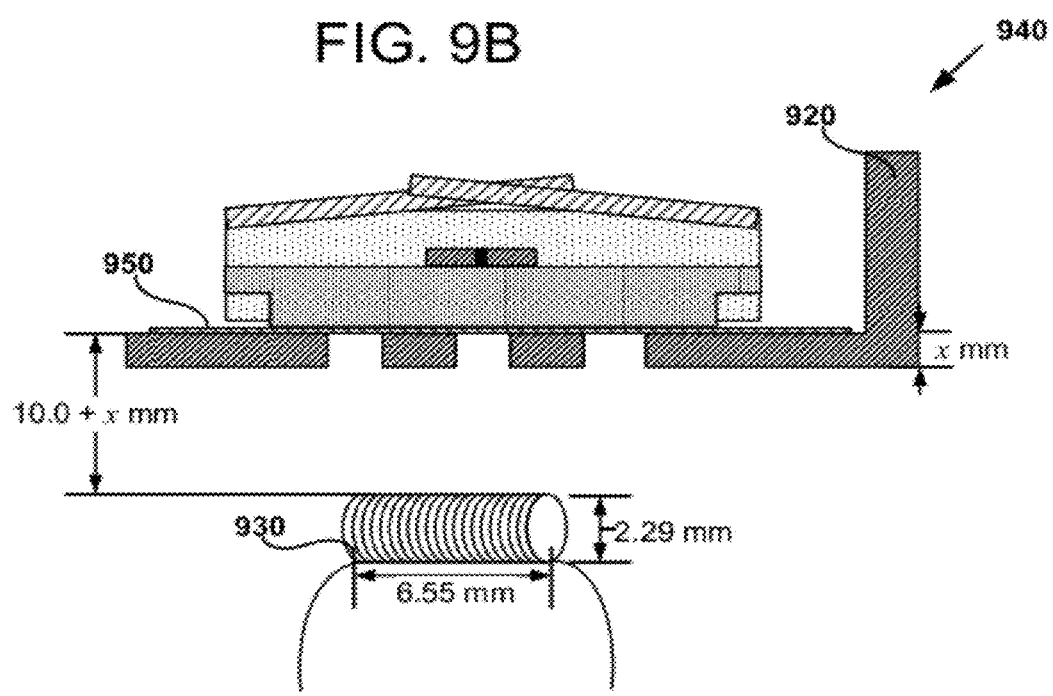

FIG. 9B is a schematic diagram of an exemplary arrangement for testing a hearing aid telecoil receiver with a speaker transmitter. A 0.2 mm austenitic stainless steel plate 950 has been attached to the mounting board 920. Thus, as shown, the telecoil receiver 930 is completely underneath the steel plate 950, which is interposed between the telecoil receiver and the speaker.

Figure 9C:
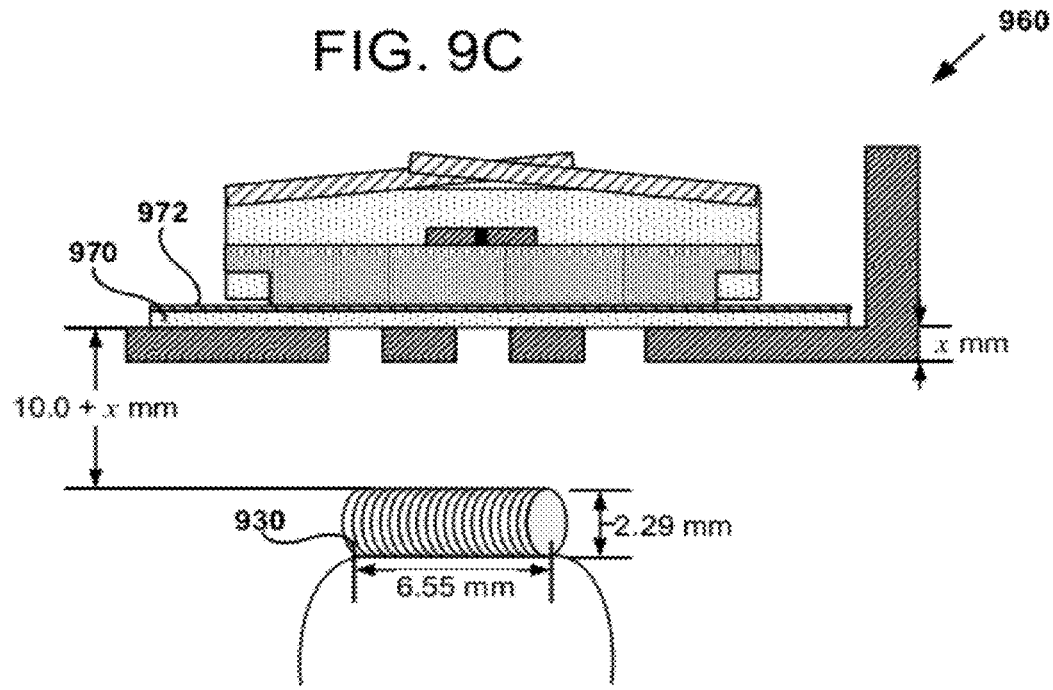

FIG. 9C is a schematic diagram of an exemplary arrangement similar to that shown in FIGS. 9A and 9B. An LCD display 970, which includes a 0.2 mm thick austenitic stainless steel backing 972 is shown attached to the mounting board 920. The LCD display 970 was powered off during the experiments described herein.

Figure 10A:
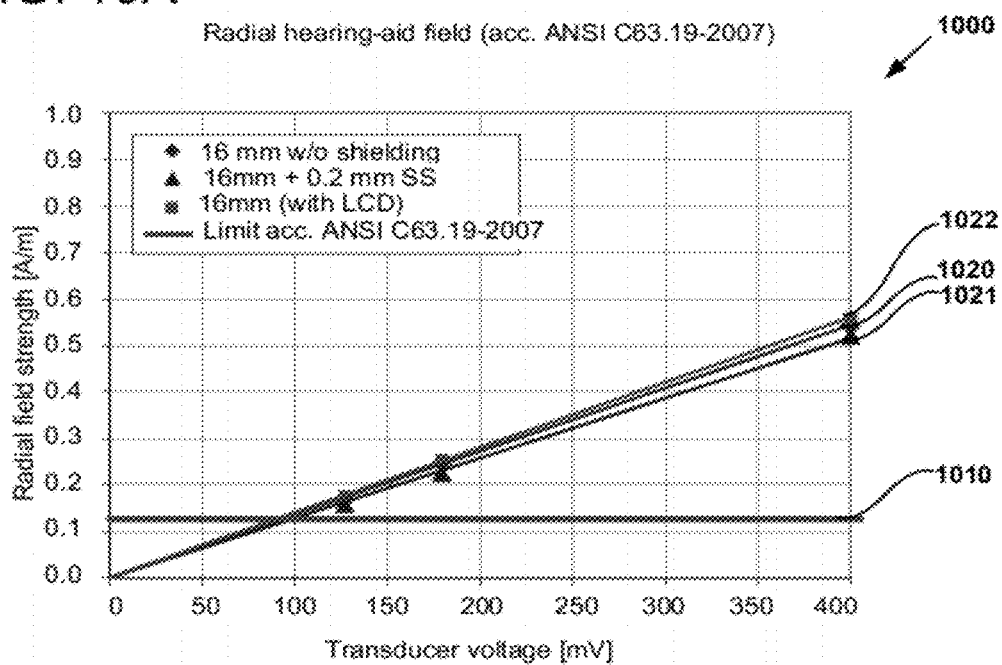
FIGS. 10A and 10B are graphs showing magnetic field strength measurements determined using the example configurations shown in FIGS. 9A-9C.
Figure 10B:
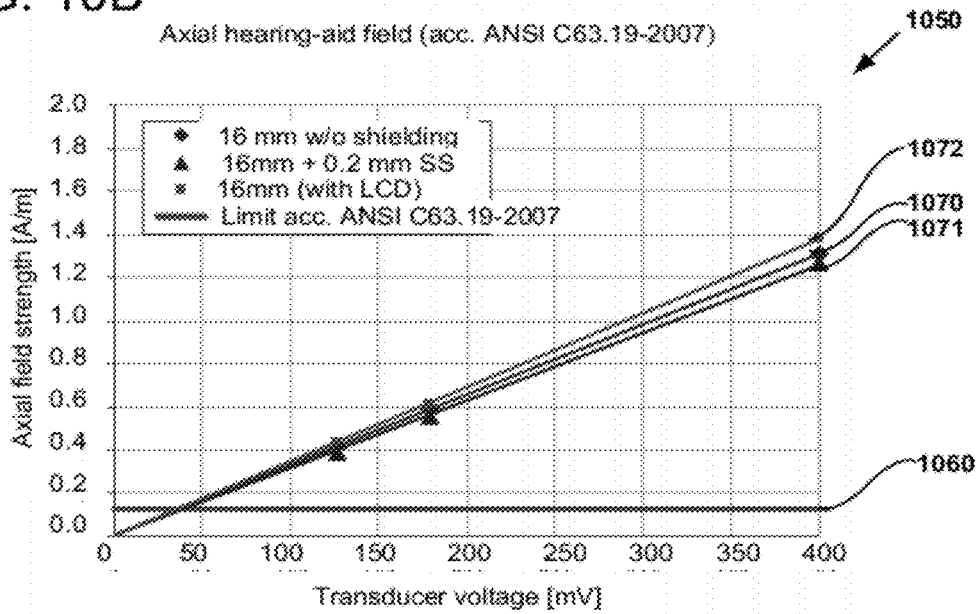

FIGS. 10A and 10B are charts depicting measurements taken with the telecoil receiver in a radial and axial positioning, respectively, using the testing techniques describes in FIGS. 8A-8B and 9A-9C. FIG. 10A includes a chart 1000 with applied transducer voltage (voltage applied to the terminals of the speaker 920, in millivolts) plotted along the X-axis and measured radial field strength (received by the telecoil 930, in Amps per meter, A/m) plotted along the Y-axis for a telecoil positioned in a radial arrangement. As discussed above in FIGS. 8A-8B and accompanying text, the telecoil is rotated to four different positions, each 90 degrees apart, and the field strength for four measurements is averaged. A first line 1010 indicates the minimum measured field strength as defined by the HAC ANSI C63.19-2007 specification. That is, the specification requires the measured axial and radial field strengths for a given arrangement to exceed 0.1259 A/m. As shown, a first line 1020 corresponds to the arrangement shown in the schematic diagram 900 of FIG. 9A. A second line 1021 corresponds to the arrangement shown in the schematic diagram 940 shown in FIG. 9B. Finally, a third line 1022 corresponds to the arrangement shown in the schematic diagram 960 shown in FIG. 9C. Thus, the arrangements shown in FIGS. 9A-9C appear to have an insignificant effect on radial magnetic field strength, and therefore are likely to be suitable in HAC-compatible applications. In fact, increased distance between the speaker 905 and the receiving telecoil 930, caused by the insertion of the stainless steel plate 950 or the LCD display 970 with stainless steel backing 972, is understood to effect the measured magnetic field strength, as shown in FIGS. 10A and 10B, more than the interposition of the austenitic stainless steel.

FIG. 10B includes a chart 1050 with applied transducer voltage (voltage applied to the terminals of the speaker 920, in millivolts) plotted along the X-axis and measured axial field strength (received by the telecoil 930, in Amps per meter, A/m) plotted along the Y-axis. Here, the telecoil receiver is arranged in an axial configuration, and only a signal measurement of field strength is taken. A first line 1060 indicates the minimum measured field strength as defined by the HAC ANSI C63.19-2007 specification. First, second, and third lines 1070, 1071, and 1072, correspond to the arrangements shown in schematic diagrams 900, 940, and 960, respectively. Thus, similar to the results depicted in the chart 1000, the lines in the axial measurement chart 1050 indicate that the arrangements shown in FIGS. 9A-9C appear to have an insignificant effect on axial magnetic field strength, and therefore are likely to be suitable in HAC-compatible applications.

V. Example Alternatives and Combinations

The techniques and solutions described in this application can be used in various combinations to provide HAC-compatible communications using wireless communications devices.

Having described and illustrated the principles of our innovations in the detailed description and accompanying drawings, it will be recognized that the various embodiments can be modified in arrangement and detail with departing from such principles. It should be understood that the apparatus and methods described herein are not limited to a particular type of technology or standard, unless indicated otherwise.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A hearing aid compatible (HAC) wireless communication apparatus, comprising:
   a housing,
   a display having a top viewing surface and bottom surface, the bottom surface of the display being positioned within the housing;
   a layer of non-ferromagnetic material interposed between the transmitter and at least a portion of the top viewing surface of the display; and
   a transmitter positioned within the housing and configured to transmit an inductive signal through at least a portion of the non-ferromagnetic material to a telecoil hearing aid receiver located in a receiving region located outside the housing and above the at least a portion of the top viewing surface of the display, the transmitter being positioned underneath at least a portion of the top viewing surface of the display.

2. The apparatus of claim 1, wherein:
   the non-ferromagnetic material comprises austenitic stainless steel; and
   the non-ferromagnetic material is coupled to the bottom surface of the display to be a support layer for the display.

3. The apparatus of claim 1, wherein a relative magnetic permeability of the non-ferromagnetic material is not greater than 1.01.

4. The apparatus of claim 1, wherein:
   the non-ferromagnetic layer covers substantially all of the bottom surface of the display.

5. The apparatus of claim 1, wherein the bottom surface of the display is substantially parallel to the top viewing surface of the display.

6. The apparatus of claim 1, further comprising an acoustic speaker having a speaker coil, wherein the transmitter is the speaker coil, and wherein the speaker coil is operable to produce the inductive signal.

7. The apparatus of claim 1, further comprising an acoustic speaker for producing an acoustic signal, wherein the transmitter is an inductive coil that is not for producing the acoustic signal, wherein the transmitter is wired in series with the speaker coil.

8. The apparatus of claim 1, wherein the area of the transmitter positioned underneath the at least a portion of the top viewing surface of the display is at least 10% of the area of the display.

9. The apparatus of claim 1, wherein the area of the transmitter positioned underneath the at least a portion of the top viewing surface of the display is at least 50% of the area of the display.

10. A wireless communication apparatus having a first axis and a second axis, wherein the first axis is perpendicular to the second axis, the apparatus comprising:
 a transmitter configured to generate an electromagnetic signal for a telecoil receiver located in a hearing aid compatible (HAC) reception zone positioned above at least a portion of the top viewing surface of the display;
 a display, the display having a substantially planar bottom surface, the display being configured when the apparatus is in an operable position such that the first axis is substantially parallel to a top viewing surface of the display; and
 a layer of non-ferromagnetic material, wherein:
  the transmitter, the display, and the non-ferromagnetic layer are each configured such that when the apparatus is in the operable position the second axis passes through at least a portion of the transmitter, at least a portion of the top viewing surface of the display, at least a portion of the non-ferromagnetic layer, and at least a portion of the HAC reception zone.

11. The apparatus of claim 10, further comprising a housing, wherein:
 the transmitter, the non-ferromagnetic layer, and at least the top viewing surface of the display are positioned inside the housing;
 the housing substantially consists of a low-carbon material, the low-carbon being selected such that it does not substantially interfere with transmission between the transmitter and a hearing aid receiver positioned outside the housing.

12. The apparatus of claim 10, further comprising a housing having a top surface and a speaker port, the speaker port being located on the top surface of the housing, wherein:
 at least a portion of the top surface of the housing is substantially parallel with the top viewing surface of the display; and
 the speaker port does not overlap the non-ferromagnetic layer.

13. The apparatus of claim 10, wherein the transmitter is a speaker coil.

14. The apparatus of claim 10, wherein the transmitter is an inductive coil that is not part of a speaker.

15. The apparatus of claim 10, wherein the non-ferromagnetic layer forms a backing covering at least a portion of a bottom surface of the display, wherein the display is a liquid crystal display (LCD).

16. The apparatus of claim 10, further comprising:
 a backlight for the display;
 a transparent cover for the display;
 an acoustic cavity, the acoustic cavity having at least one speaker port, wherein the speaker port is not intersected by the second axis;
 a housing, wherein the housing is made of a low-carbon material for avoiding interference with a hearing aid;
 a touch screen sensor below the transparent cover; and
 wherein the non-ferromagnetic material comprises austenitic stainless steel.

17. The apparatus of claim 16, wherein the display is configurable to be positioned such that the first axis is substantially parallel to the top surface during operation of the transmitter.

18. A method of operating a wireless transmitter, comprising:
 producing a communication signal; and
 transmitting an inductive signal from the transmitter through a layer of non-ferromagnetic material substantially parallel to a viewing surface of an electronic display to a reception area located in front of at least a portion of the viewing surface of the electronic display, wherein:
  a telecoil receiver positioned within the reception area is operable to receive the inductive signal,
  the inductive signal is derived from the communications signal, and
  the non-ferromagnetic layer is at least partially interposed between the viewing surface of the electronic display and the transmitter.

19. The method of claim 18, wherein the communication signal is an audio signal and the electromagnetic receiver is a telecoil in a hearing aid.

20. The method of claim 18, wherein the communication signal is a data signal and the electromagnetic receiver is a radio-frequency identification (RFID) or electronic article surveillance receiver.

* * * * *